United States Patent [19]

Dungs

[11] Patent Number: 5,735,645

[45] Date of Patent: Apr. 7, 1998

[54] ROTARY CUTTING DEVICE

[75] Inventor: Manfred Dungs, Klein-Ostheim, Germany

[73] Assignee: Branson Ultraschall, Dietzenbach, Germany

[21] Appl. No.: 599,760

[22] Filed: Feb. 12, 1996

[30] Foreign Application Priority Data

Feb. 13, 1995 [DE] Germany ............ 195 05 111.4

[51] Int. Cl.$^6$ ............... B23B 35/00; B23B 51/05
[52] U.S. Cl. ............... 408/1 R; 408/67; 408/110
[58] Field of Search ............... 408/1 R, 67, 36, 408/96, 110, 208, 207

[56] References Cited

U.S. PATENT DOCUMENTS

| 1,219,461 | 3/1917 | Johnston | 408/96 |
|---|---|---|---|
| 1,354,830 | 10/1920 | Janes | 408/67 |
| 2,435,648 | 2/1948 | Frevel | 408/67 X |
| 2,484,150 | 10/1949 | Brown | 408/96 X |
| 3,487,728 | 1/1970 | Riley et al. | |
| 3,854,840 | 12/1974 | Miyanaga | 408/208 X |
| 5,316,418 | 5/1994 | Miyanaga | |
| 5,393,175 | 2/1995 | Courville | 408/207 X |

FOREIGN PATENT DOCUMENTS

| 1770359 | 5/1958 | Germany |
|---|---|---|
| 7622904 | 4/1976 | Germany |
| 2910642 | 3/1979 | Germany |
| 2935565 | 3/1979 | Germany |
| 3008268 | 3/1979 | Germany |
| 3321091 | 6/1983 | Germany |
| 3411557 | 3/1984 | Germany |
| 3603627 | 2/1986 | Germany |
| 4122997 | 7/1991 | Germany |
| 95633 | 12/1996 | Germany |

Primary Examiner—Daniel W. Howell
Assistant Examiner—Henry W. H. Tsai
Attorney, Agent, or Firm—Emrich & Dithmar

[57] ABSTRACT

The present invention relates to a cutting device for making holes, in particular holes in walls of hollow bodies made of plastic material, comprising a mount to which a cutting tool for cutting out a hole is secured, the mount being rotatably driven and performing an axial feeding motion, and an engaging member penetrating a disk which becomes separated in cutting the hole, the engaging member centrically penetrating the disk with respect to the periphery of the hole and withdrawing the separated disk which is then removed from the engaging member. The engaging member is axially displaceable and rotatably driven independent of the cutting tool and includes a self-cutting threaded profile turned into the disk before starting the cutting operation of the cutting tool and engaging the disk by forming a thread by means of the self-cutting thread of the engaging member.

14 Claims, 6 Drawing Sheets

ROTARY CUTTING DEVICE

The present invention relates to a rotary cutting device for making circular holes, in particular in walls of hollow bodies.

BACKGROUND OF THE INVENTION

Fuel tanks made of plastic material are conventionally manufactured by blow molding, followed by a further tooling such as cutting holes in the wall at the tanks which holes are required for mounting venting fittings, valves, a fuel level indicator or the like to the tank. While cutting the hole neither chips shall be created nor the separated disk shall fall into the tank.

German 34 11 557 C2 discloses a cutting tool for making holes in hollow bodies, comprising a scratching and cutting knife and a mandrel arranged in the tool axis to act as a holding member. This system suffers from the drawback that the holding member which is thought to engage the disk which becomes separated after the cutting operation has been completed for removing it from the hole by securing it to the rotary cutting head. However, the cut-off disk is merely hold by a frictional engagement.

While feeding forward, the rotary tool cutting into the wall of the hollow body, the holding member alike penetrates the wall such that after the knife has pierced through the wall, there is the danger that the disk cut-off will be pushed inside the hollow body, in particular when the axial feed of the cutting tool will be not immediately stopped after having separated the disk. Since fuel tanks blown from plastic material substantially possess quite differing dimensions, the walls receiving the holes will have different distances with respect to the starting position of the cutting tool and the walls have different thicknesses; it is thus required that a certain safety distance for the axial feed path of the cutting tool and the engaging member should be provided to be sure that the hole is completely cut. From this follows that the separated disk may enter the hollow body through the hole just cut out. Now, when the cutting tool including the disk is being withdrawn from the hole, the disk may engage the wall of the hole, slipping from the holding member and falling back into the tank.

During the cutting process, high cutting and deforming forces act onto the tank surface depending on the diameter of the hole to be cut and the hardness of the tank material. This results in a deformation of the wall in the direction of the feeding motion. After the cutting tool pierces through the wall, the latter springs back into its original position, thus the inner edge of the cut hole is not located anymore parallel to the rotary axis of the cuting tool and the rotating cutting tool creates cutting chips along the inner or outer edge of the hole. The chips fall into the tank and may result in a faulty operation after assembling the tank in an automotive vehicle. The problems above referred to are not avoided by the prior art disclosing a scewing adjustment of the cutting tool. Rather, setting the cutting tool under an angle with respect to the rotary axis, will merely create tapered holes, wherein the inclined position of the cutting tool results in a peeling action creating chips rather than a cutting operation.

SUMMARY OF THE INVENTION

According to the invention there is provided a cutting device for making holes, in particular holes in walls of hollow bodies made of plastic material, comprising a mounting means to which a cutting tool for cutting out a hole is secured, said mounting means being rotatably driven and performing an axial feeding motion, and an engaging means penetrating a disk which becomes separated in cutting the hole, said engaging means centrically penetrating said disk with respect to the periphery of the hole and said engaging means withdrawing the separated disk which is then removed from the engaging means, the improvement being characterized in that said engaging means is axially displaceable and rotatably driven independent of said cutting tool and that said engaging means includes a self-cutting threaded profile turned into the disk before starting the cutting operation of the cutting tool and engaging said disk by forming a thread by means of the self-cutting thread of said engaging means.

The present invention provides for the benefits that the cutting operation does not result in creating chips and that the separated disk cannot fall into the tank. Accordingly, the following conditions are met:

1) The position of the tank surface with respect to the cutting tool should be measured.

2) The cutting tool and the disk engaging member must operate independently with respect to each other.

3) The separated disk must be positively engaged and not merely by friction.

4) The engaging member may not move axially with respect to the feeding direction of the cutting tool during the cutting operation.

5) The cutting tool may not rotate anymore after piercing through the wall thus avoiding the creation of chips.

6) The bending of the wall while performing the cuting operation must be avoided.

7) The engaging member shall be replaced by different engaging tools, in particular when a hole of larger diameter shall be cut around a previously cut hole.

8) The engaging member may not create any chips.

BRIEF DESCRIPTION OF THE DRAWINGS

An embodiment of the invention will be now described by way of example with reference to the accompanying drawings of which.

DETAILED DESCRIPTION OF THE EMBODIMENT

Figure 1:
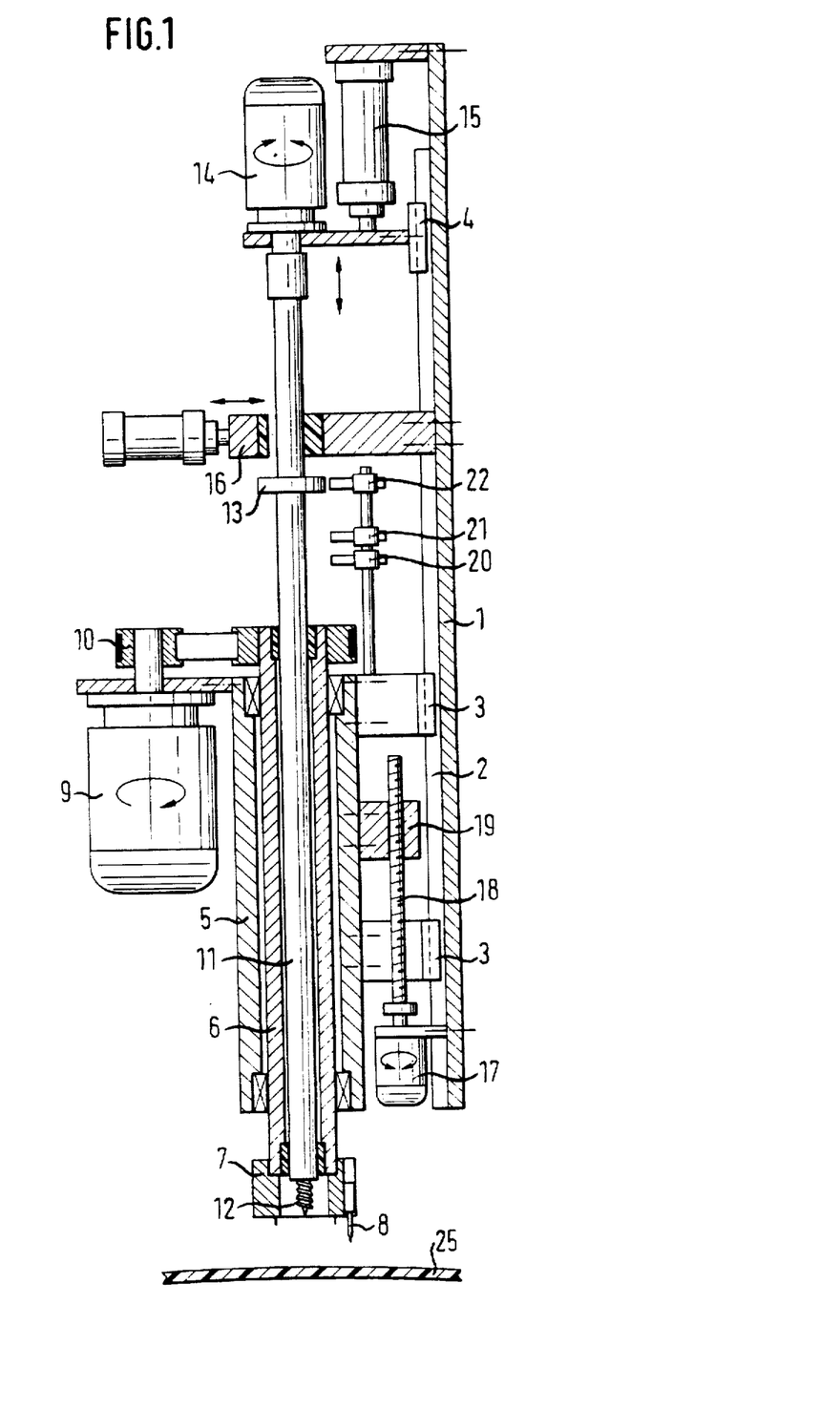
FIG. 1 shows a side section of a cutting device which is shown in an original position.

Referring to the drawings, in particular FIG. 1 there is a base plate 1 to which a guiding rail 2 is attached. A pair of spaced apart guide plates 3 cooperating with the guide rail is mounted to a carriage 5 rotatably supporting a hollow sleeve 6 to the lower end a mounting member 7 is attached. The mounting member 7 supports a cutting tool 8. The hollow sleeve 6 and thus the cutting tool 8 will be rotatably driven by an electrical motor 9 through a built drive 10.

A further carriage 4 cooperates with the guide rail 2 above the carriage 3, 5. The carriage 4 rotatably supports a shaft 11 to which an engaging member 12 is secured. The shaft 11 and thus the engaging member 12 is rotatably driven by an electro motor 14 mounted on the carriage 4.

The axial position of the shaft 11 is controlled by a servo motor 15. The axial position of the shaft and thus of the engaging member 12 is indicated by initiators 20, 21 and 22 cooperating with an actuator 13 mounted to the shaft 11. The shaft 11 may be blocked by a clamping actuator 16.

The axial feeding motion of the cutting tool 8 is controled by an electro motor 17 acting through a ball bearing spindle 18 to an spindle nut 19 mounted on the carriage 5.

The cutting device operates as follows:

In the original position shown in FIG. 1 the shaft 11 to which the engaging member 12 is attached is rotatably driven by the electro motor and then axially displaced by the axially acting servo motor 15. Thus the engaging member 12 while being rotated is fed towards the tank 25. As soon as the engaging member contacts the tank surface, the tip of the threaded profile engages the wall and subsequently forms a thread in the wall due to its rotation and the self-cutting feature of the thread.

While forming the thread, the servo motor 15 will be disabled. Accordingly, the engaging member 12 being merely rotated will be drawn into the wall, thus creating no chips as the thread is formed into the wall by merely displacing the material.

Figure 2:
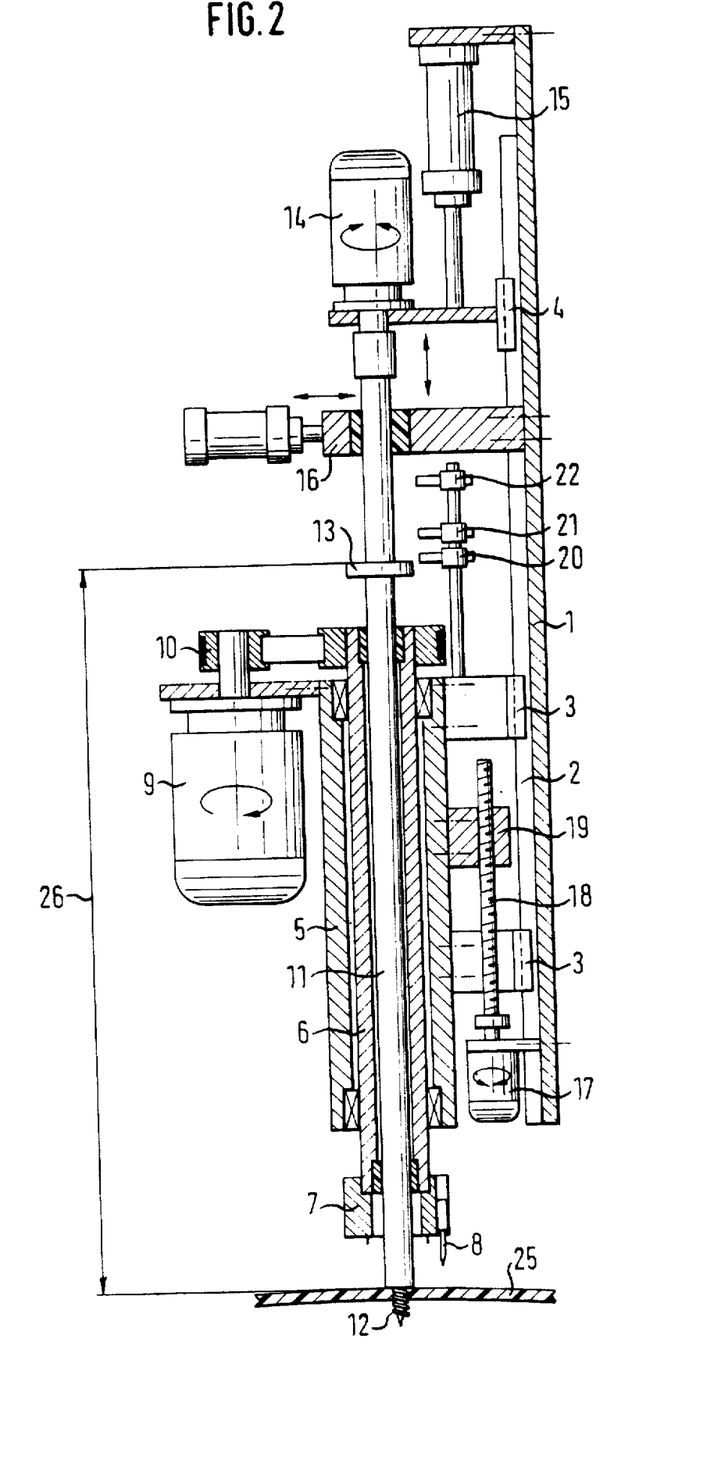
FIG. 2 is a view similar to FIG. 1 but in a position where the engaging member has been turned into the work-piece.

According to FIG. 2 the engaging member 12 has fully penetrated the wall of the tank such that the end face of the shaft 11 engages the surface of the wall. Thus the torque delivered by the electro motor 14 rapidly increases as the engaging member 12, the shaft 11 and the wall are blocked with respect to each other.

The increase of torque will be evaluated and accordingly the electro motor 14 is switched off. The clamping system 16 is actuated to lock the shaft 11 and thus the engaging member in the position shown in FIG. 2, which further shows that the actuator 13 is mounted to the shaft 11 in a predetermined distance 26 from the surface of the wall 25. Thus the actuator 13 accurately indicates the distance between the surface of the tank and the position of the cutting tool 8.

After actuating the clamping unit 16, the electromotor 9 is activated thus rotatably driving the hollow sleeve 6 through the belt drive 10 to rotatably drive the mounting member 7 and the cutting tool 8. Then the spindle drive 17, 18, 19 is activated to feed the rotating cutting tool towards the surface of the tank.

Figure 3:
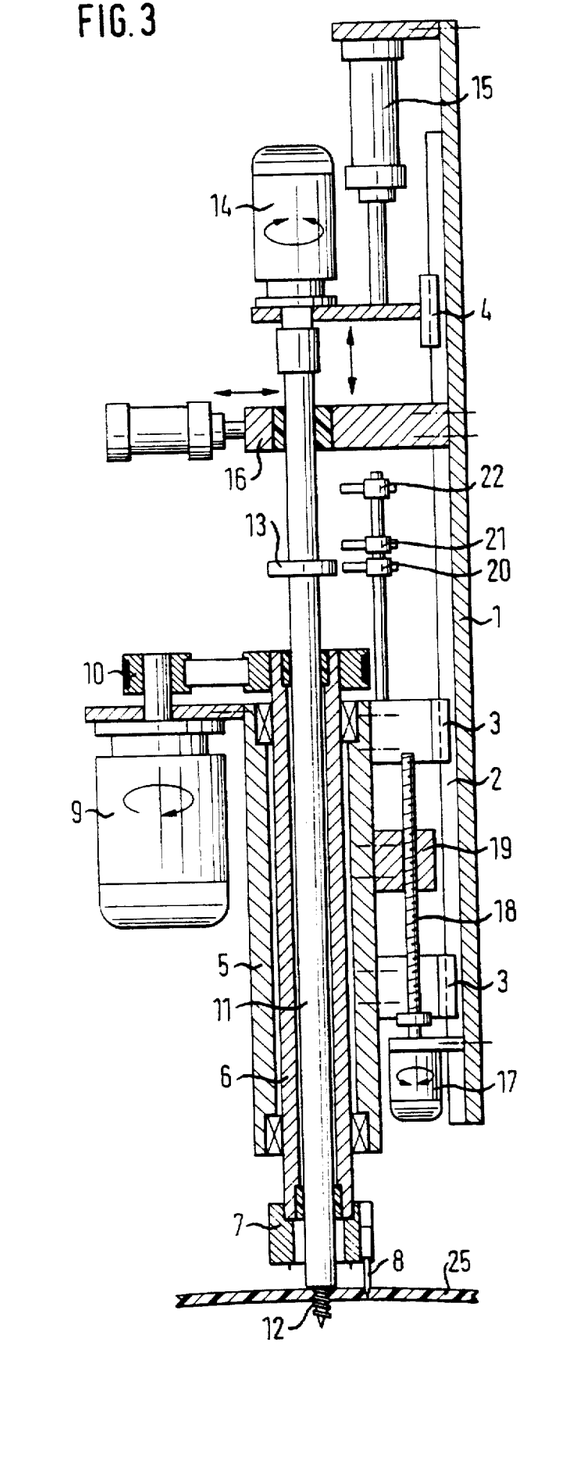
FIG. 3 is a view similar to FIG. 2, but in a position, where the cutting tool is operated.
Figure 3A:
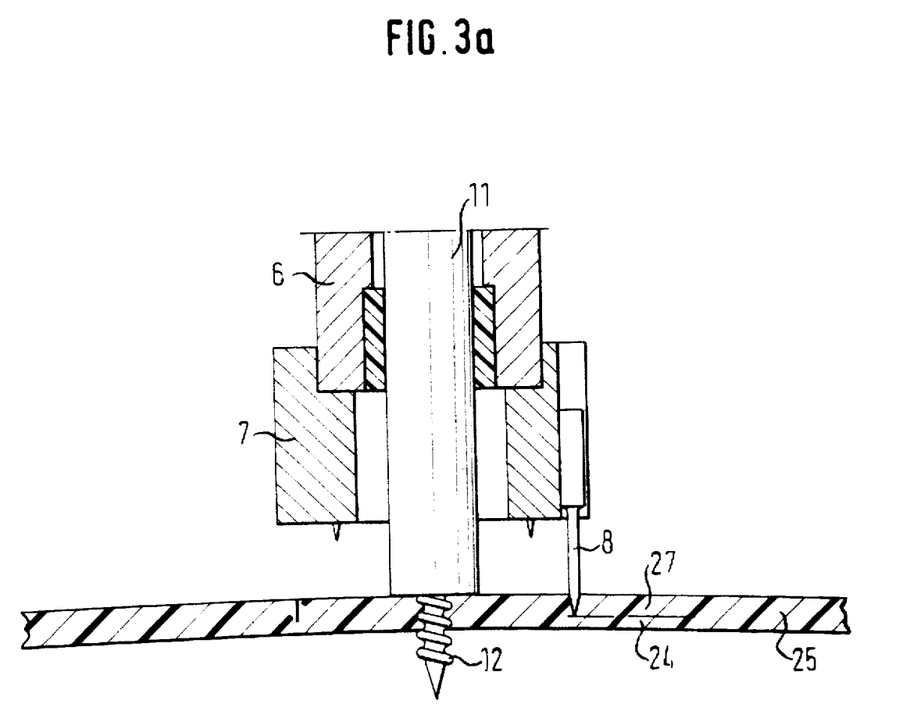
FIG. 3a is a view of the cutting tool and engaging member in an enlarged scale and in a position in which the rotation of the cutting tool is stopped.

As FIG. 3 shows, the rotating tool 8 cuts into the wall until the initiator 20 reaches the position of the actuator 13. Then the electro motor 9 and the spindle drive means 17, 18, 19 are deactivated. In this position shown in FIG. 3a the cutting tool 8 has reached an accurately predetermined depth 27. As FIG. 3a shows, the tip of the cutting tool still has a slight distance 24 from the lower end of the wall not yet cut. Now, the spindle drive 17, 18, 19 is restarted and the cutting tool 8 is forced to pierce through the remaining wall thickness while the cutting tool is not being rotated.

Figure 4:
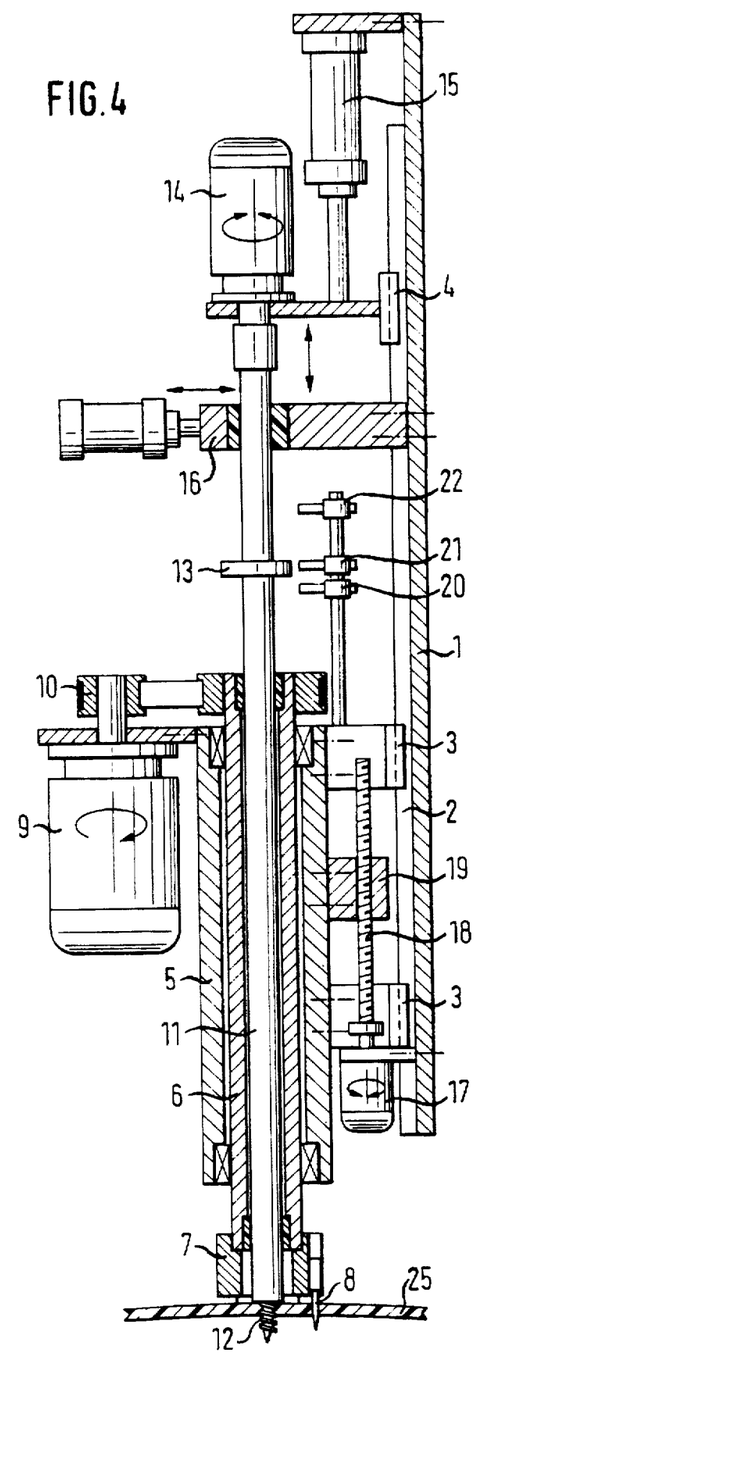
FIG. 4 shows a view similar to FIG. 2 in a position, where the cutting tool pierces through the wall of the workpiece

As FIG. 4 shows, this position is indicated by the initiator 21. Now the electro motor 9 is restarted, the cutting tool rotates around 360° and the motor 9 is switched off. Accordingly the remaining wall of the disk will be thus cut out by a single rotation of a cutting tool 8.

Figure 5:
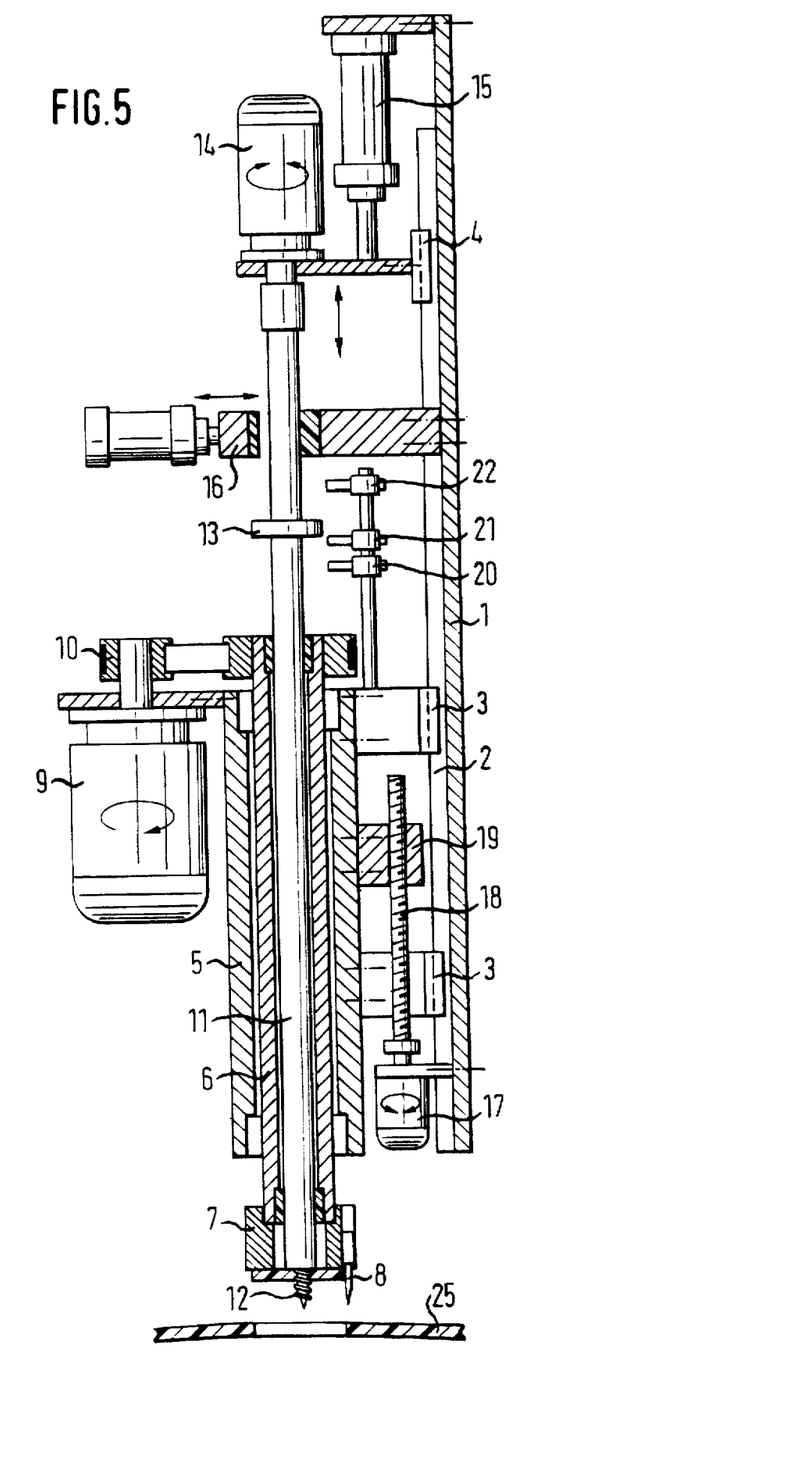
FIG. 5 is a view similar to FIG. 4 in a position of the cutting device removing the separated disk.

According to FIG. 5, the cutting tool is returned to its original position through activating the spindle drive 17, 18, 19. In this position, the engaging member 12 to which the cut-out disk is attached, is withdrawn from the hole until the disk engages the mounting member 7.

After this position is obtained, the electro motor 14 is restarted, but in a reverse direction of rotation, thus the engaging member becomes released from the disk which may be dispensed.

An important feature of the present invention is the independent actuation of the cutting head with respect to the disk engaging member.

I claim:

1. In a cutting device for making holes in walls of hollow bodies made of plastic material, including a mounting means to which a cutting tool for cutting out a hole is secured, said mounting means being rotatably driven and performing an axial feeding motion, and a disk engaging member penetrating a disk which becomes separated in cutting the hole, said engaging member centrally penetrating said disk with respect to the periphery of the hole and said engaging member withdrawing the separated disk which is then removed from the engaging member, the improvement comprising: a drive assembly for axially displacing and rotatably driving said engaging member independent of said cutting tool, said engaging member including a self-cutting threaded profile turned into the disk before starting the cutting operation of the cutting tool and engaging said disk by forming a thread by means of the self-cutting thread of said engaging member.

2. The cutting device of claim 1, wherein said drive assembly includes a servo motor for longitudinally feeding said disk engaging member and means for deactivating said servo motor while forming a thread in the disk by rotatably driving said engaging member which is drawn into the disk in forming a thread therein.

3. The cutting device of claim 1, and further comprising a hollow sleeve to which the mounting means is secured and a rotatably driven shaft which is rotatably and axially displaceably mounted in the hollow sleeve.

4. The cutting device of claim 3, wherein the hollow sleeve is rotatably mounted in a carriage to which a drive means for rotating the cutting tool is attached.

5. The cutting device of claim 4, wherein the carriage is mounted to a base plate by means of a guide rail, the device further comprising a drive unit for axially feeding said carriage.

6. The cutting device of claim 5, and further comprising a further carriage mounted to the base plate and including a rotary drive means and a servo motor for axially feeding said disk engaging member.

7. The cutting device of claim 1, and further comprising a blocking means to clamp the disk engaging member in a predetermined position.

8. The cutting device of claim 1, and further comprising means for measuring the longitudinal displacement of the cutting tool with respect to the disk engaging member.

9. The cutting device of claim 8, and further comprising a shaft to which the disk engaging member is secured, an actuator on the shaft, a carriage to which the cutting tool is secured, and level indicators on the carriage cooperating with said actuator.

10. The cutting device of claim 9, wherein said level indicators include a first level indicator indicating when the cutting tool reaches a predetermined depth in the wall, a second indicator indicating the level for piercing the cutting tool through the remainder of the wall and a third indicator indicating the original position of the disk engaging member.

11. The cutting device of claim 1, wherein the disk engaging member is replaceable.

12. The cutting device of claim 1, wherein the disk engaging member includes a stop means cooperating with the disk.

13. A method for making a hole using the cutting device of claim 1, wherein the disk to be separated from a wall is positively secured to a disk engaging member by forming a self-cutting thread therein, wherein the cutting tool is rotatably driven to penetrate the wall to a predetermined depth while the disk engaging member is fixed against rotation, whereupon the cutting tool is pierced through the remainder of the hole, then the rotation of the cutting tool is restarted to cut out the disk which is then withdrawn from the hole by the disk engaging member after releasing the disk engaging member.

14. The method of claim 13, wherein separating the disk after piercing is performed by a single rotation of the cutting tool around 360°.

* * * * *

UNITED STATES PATENT AND TRADEMARK OFFICE
CERTIFICATE OF CORRECTION

PATENT NO. : 5,735,645
DATED : April 7, 1998
INVENTOR(S) : Manfred Dungs It is certified that error appears in the above-identified patent and that said Letters Patent is hereby corrected as shown below:

On the title page,
[73] "Branson Ultraschall" should be --Branson Ultraschall Niederlassung der Emerson--.

Signed and Sealed this

Twelfth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,735,645
DATED : April 7, 1998
INVENTOR(S) : Manfred Dungs

It is certified that error appears in the above-indentified patent and that said Letters Patent is hereby corrected as shown below:

Title page, item [73], Assignee: should read --"Branson Ultraschall Niederlassung der Emerson Technology GmbH & Co.--.

Signed and Sealed this

Nineteenth Day of October, 1999

Attest:

Q. TODD DICKINSON

*Attesting Officer*  *Acting Commissioner of Patents and Trademarks*